Patented Feb. 28, 1950

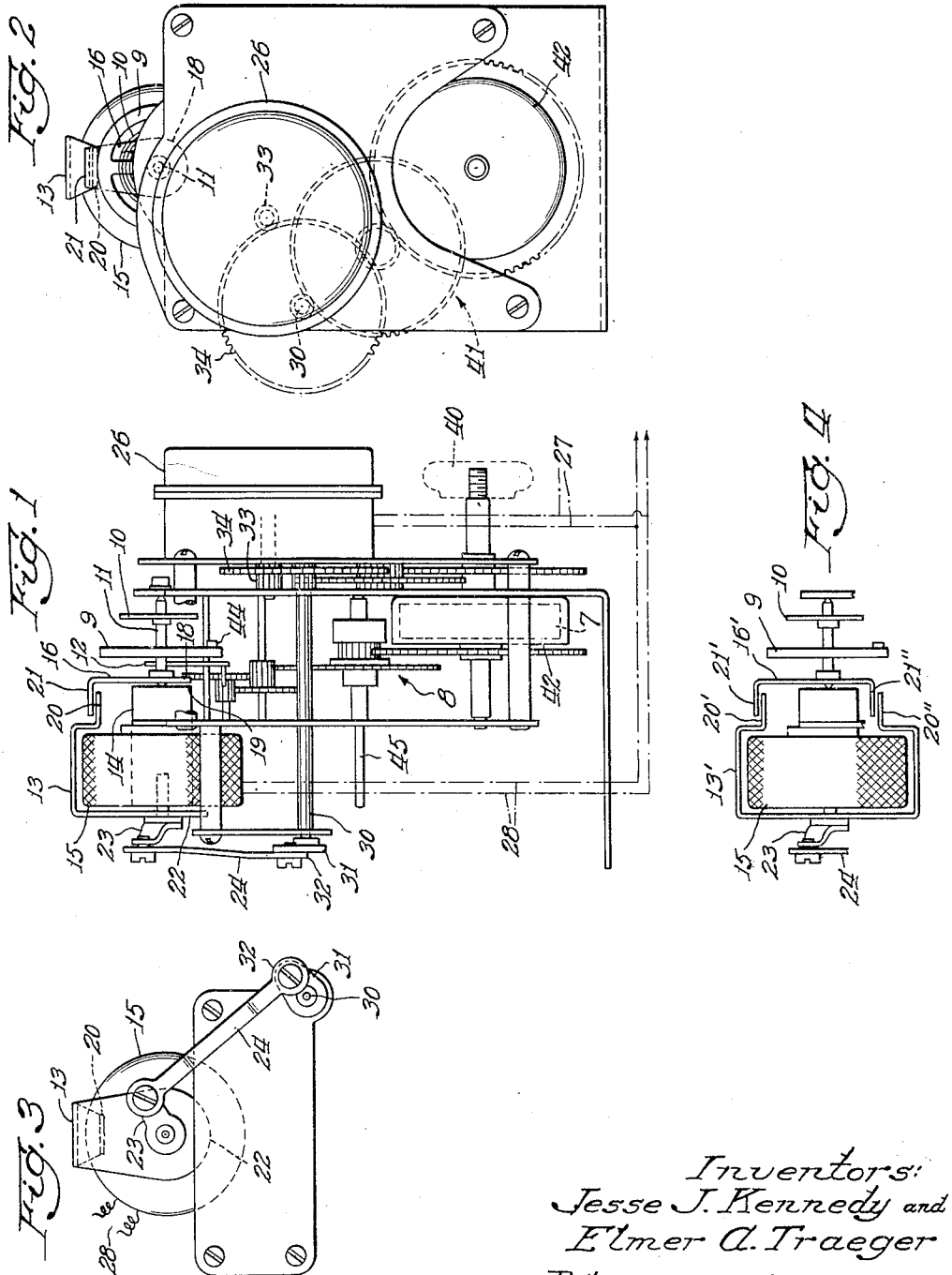

2,499,223

UNITED STATES PATENT OFFICE 2,499,223

ELECTRICALLY SYNCHRONIZED TIMING MECHANISM

Jesse J. Kennedy, San Bernardino, Calif., and Elmer A. Traeger, Peru, Ill., assignors to General Time Corporation, a corporation of Delaware Application August 13, 1945, Serial No. 610,430

1 Claim. (Cl. 58—26)

This invention relates to electric clocks and other time controlled instruments of the so-called "carry over" or "sustaining power" type wherein an electrically wound spring motor drives the clock and continues to supply power during failure of current. For convenience such instruments will be referred to as clocks, but it should be understood that the invention includes similarly driven synchronized instruments.

Among other objects the invention aims to provide improved means for synchronizing spring driven clocks by alternating current power supply.

A further object is to provide means for avoiding interference of the synchronizing means with the operation of the clock during periods of current failure.

Another object is to provide a simple synchronizing mechanism which may be easily incorporated in the conventional spring clock mechanism.

Other objects and advantages and the nature of the invention will become apparent in the following description of one apparatus embodying the invention and illustrated in the accompanying drawing.

In said drawing:

Figure 1 is a side elevation of the clock with all external casing removed to reveal the interior;

Fig. 2 is a rear elevation thereof;

Fig. 3 is a fragmentary front elevation thereof showing the synchronizing means; and Fig. 4 is a side elevation of a modified synchronizing means.

Carry over clocks embodying an electric motor and alternatively available spring motor, and wherein the spring motor was idle except during periods of current failure, have proved unsatisfactory because of frequent failure of the spring driven mechanism to start when desired (due to static friction and viscosity of lubricants, etc.). Among other improvements it has been proposed that the clock be driven continuously by the spring motor and that the synchronous electric motor, in addition to rewinding the spring motor actuate means such as a magnet for insuring operation of the spring driven clock mechanism synchronously with the alternating current. Of course during current failure the usual regulator, e. g. balance wheel, is intended to function independently to regulate the spring driven mechanism, but it has been found that such synchronizing magnets do actually interfere with operation of the clock during periods of current failure. It is to that problem that the present invention is particularly addressed.

The illustrative clock embodies a magnetic synchronizing mechanism which is wholly idle during periods of current failure and does not interfere with or influence operation of the clock. The clock here shown embodies a main spring 7 driving a conventional gear train or time movement 8 controlled by an oscillatory regulating device in the form of a balance wheel 9 and hairspring 10 on balance shaft 11. Associated therewith are the conventional pallet 12 and escapement.

Oscillation of the regulator, in this case the balance wheel 9, in synchronized (while alternating current is on) by a pair of juxtaposed magnetizable elements, one of which is connected with the balance wheel and the other of which is oscillated by the synchronous motor. As here shown the operating magnetizable element 13 is associated with the core 14 of electromagnet 15 from which it derives its magnetic flux. The other magnetizable element or armature 16 is mounted on balance shaft 11 to oscillate with the balance wheel and is magnetizably coupled by the electromagnetic flux to operating element 13. The core of electromagnet 15, the oscillating magnetizable element 13 and armature 16 are made of iron of high permeability and low retentivity so as to retain no residual magnetism with interruption of current through the electromagnet 14. The hub 18 of armature 16 is preferably located close to the end 19 of the magnet core so as to minimize the air gap for the magnetic flux. Similarly the ends or pole pieces 20 and 21 of the element 13 and armature 16 are located in close proximity to minimize the air gap.

The hub 22 of element 13 oscillates coaxially with armature 16 (i. e. with shaft 11) with which the magnet core in this case (the electromagnet 14 being preferably of circular section) is also coaxial. It is connected with oscillating means here shown in the form of a rocker arm 23 connected to the magnet hub and an operating link 24. The operating elements of the oscillating mechanism such as the rocker arm 23 and link 24 are preferably nonmagnetic in character (such as brass) so as not to conduct magnetic flux to other portions of the clock mechanism. The element 13 is oscillated at a rate corresponding to the correct oscillation rate for the balance wheel 9 by a synchronous motor 26 adapted to be connected by lines 27 with a source of alternating current whose frequency is time regulated in the well known manner. In the present case electromagnet 15 is connected in parallel with the synchronous motor by lines 28.

The synchronous motor may be of any appropriate type. That here shown is self starting with a shell type rotor. If a motor of the manual starting type be used, it should preferably be provided with a visual or audible signal to indicate need for manual re-starting. The details of the synchronous motor form no part of the present invention. The motor is connected with the magnet oscillating mechanism by a shaft 30 which carries a rocking arm 31 pivoted to the other end 32 of oscillating link 24. Shaft 30 is rotated at the proper synchronous speed by the motor through reduction gearing in the form of a pinion 33 on the motor shaft and gear 34 on shaft 30. The latter gear may advantageously be a fibre or Bakelite gear, to reduce noise.

During normal operation, that is when current is on, the synchronous motor oscillates element 13 at a proper speed and compels the latter, through the magnetic coupling between element 13 and armature 16 on the balance wheel, to oscillate in synchronism with the oscillation of element 13. The clock is thereby controlled by the frequency of the alternating current rather than by the adjustment of the hairspring, but during such operation the clock spring 11 nevertheless supplies to the extent necessary, the power for oscillating the balance wheel. Since the normal frequency of the balance wheel is adjusted as nearly as may be to the frequency of the oscillating element 13 there is little tendency for the armature and element to get out of step but the magnetic flux insures the maintenance of synchronous operation just as though the clock were directly driven by the synchronous motor. During periods of failure of current magnetic flux is entirely absent in the armature and magnet and since there is no residual magnetism in the iron circuit, the balance wheel and armature 16 continue to operate uninfluenced by the presence of the electromagnet. While the clock spring may be of any desired capacity, a 24-hour spring is generally ample since current interruptions are usually of very short duration.

While the clock spring 7 may be wound by hand through the conventional key 40 it is preferably continuously rewound, so long as current is on, by the synchronous motor through reduction gearing (which gearing is only symbolized by gearing 41) at a rate which is slightly in excess of the rate at which it normally unwinds. The spring enclosing barrel 42 is of a type wherein the spring slips when fully wound, thereby permitting the synchronous motor to continue operation at synchronous speed. Of course the power required to cause the barrel to slip is substantially less than that of the motor so that there is no danger of stalling the motor or causing it to operate at less than synchronous speed. Details of construction of the spring barrel are conventional and form no part of the present invention.

Preferably the mass of balance wheel 9 is made substantially greater than in ordinary clock mechanism so that it will have a relatively low frequency of oscillation, thereby correspondingly reducing the necessary frequency of oscillation for element 13. The armature 16 in the present case is counterbalanced by counterbalance screws 44 on the balance wheel. Clock hands (not shown) or other time controlled devices are driven by the main shaft 45.

In Fig. 4 is illustrated a modified form of oscillating magnetizable element 13' provided with two ends or pole faces 20' and 20'' unequally spaced from the center or axis of oscillation. Similarly the armature 16' is provided with two terminals 21' and 21'' located in close proximity to the respective pole faces 20' and 20''. This arrangement (differentially located poles) makes its unnecessary to limit the normal angle of oscillation of the balance wheel. If the balance wheel normally oscillates through a large enough angle it would be possible to have the single pole oscillating element 13 magnetically coupled out of phase with the armature and balance wheel. Thus improperly coupled subsequent oscillation would not permit the pallet to escape. With two pole and armature faces unequally distant from the center, the armature can only be coupled with the oscillating element 13' in the proper phase relationship. The distance between pole 20' and armature terminal 21'' for example is too great to permit magnetic coupling with the balance wheel 180° out of phase.

It will be apparent that application of the invention to a clock or the like requires no basic change in the clock mechanism. The synchronizing devices may therefore be readily added to conventional clock mechanisms.

Obviously the invention is not limited to the details of the illustrative instrument since these may be variously modified. Moreover it is not indispensable that all features of the invention be used conjointly since various features may be used to advantage in different combinations and subcombinations.

We claim as our invention:

A spring driven clock mechanism comprising a regulator including a balance wheel, an electromagnet having an oscillatable element co-axial with the balance wheel and forming a part of the magnetic circuit of said electromagnet, said oscillatable element having two extremities positioned at unequal distances from the balance wheel axis; an armature mounted co-axially with said balance wheel and adapted to oscillate therewith; said armature having two extremities positioned at unequal distances from the balance wheel axis, said armature extremities overlapping said element extremities, the armature extremity closer to the balance wheel axis being adapted to be magnetically coupled to the element extremity closer to said axis and the further armature extremity being adapted to be magnetically coupled to the further element extremity when the electro-magnet is energized; said extremities being so arranged that the closer armature extremity will not magnetically couple with the further element extremity or vice versa; a synchronous motor; and means to oscillate said element by said synchronous motor at a frequency corresponding to the correct frequency for said balance wheel.

JESSE J. KENNEDY.
ELMER A. TRAEGER.

REFERENCES CITED

The following references are of record in the file of this patent:

UNITED STATES PATENTS

| Number | Name | Date |
|---|---|---|
| 2,091,841 | Warren | Aug. 31, 1937 |

FOREIGN PATENTS

| Number | Country | Date |
|---|---|---|
| 394,965 | Great Britain | Aug. 22, 1933 |
| 845,449 | France | May 15, 1939 |
| 851,358 | France | Oct. 2, 1939 |